UNITED STATES PATENT OFFICE.

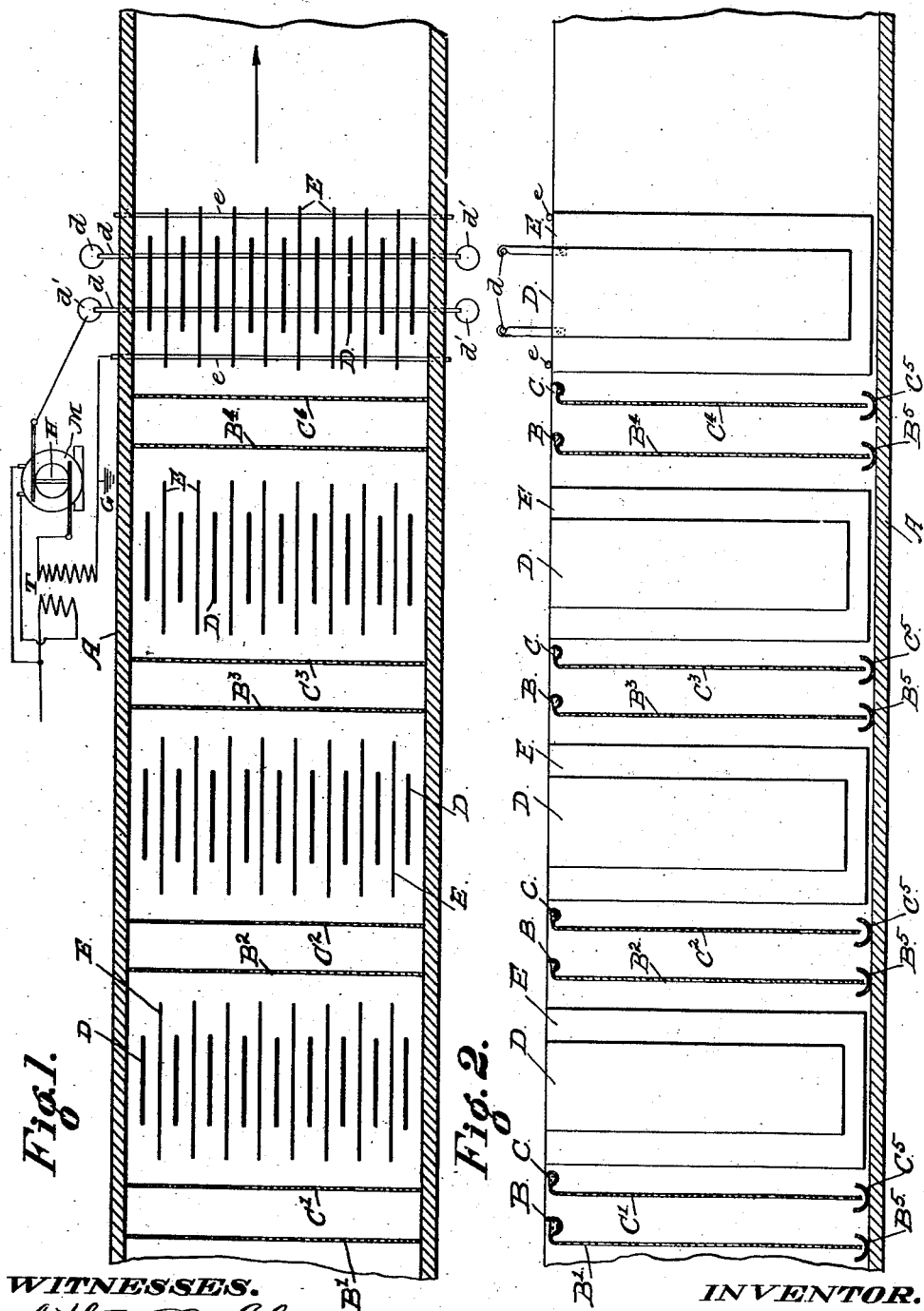

FREDERICK GARDNER COTTRELL, OF BERKELEY, CALIFORNIA, ASSIGNOR TO INTERNATIONAL PRECIPITATION COMPANY, OF SAN FRANCISCO, CALIFORNIA, A CORPORATION OF CALIFORNIA.

PURIFICATION OF GASES.

1,016,476.      Specification of Letters Patent.      Patented Feb. 6, 1912.

Application filed February 26, 1909, Serial No. 480,243. Renewed July 1, 1911. Serial No. 636,514.

*To all whom it may concern:*

Be it known that I, FREDERICK GARDNER COTTRELL, a citizen of the United States, residing at Berkeley, in the county of Alameda and State of California, have invented certain new and useful Improvements in Purification of Gases, of which the following is a specification.

My invention relates to the art of purifying gases, and, especially to those processes or methods which involve the production, in said gases, of a cloud of non-gaseous particles and then removing such cloud.

My invention is of special importance in the purification of gases going to the catalyzing substances in the "contact process" for manufacturing sulfuric anhydrid, and, eventually sulfuric acid.

It is well known that the gases generated by burning any of the commercial forms of sulfur or sulfids, contain impurities such as selenium, tellurium, unburned sulfur, compounds of arsenic, organic matter, etc., which destroy the activity of the platinum contact mass or catalyzer, which class of impurities will hereinafter be referred to as noxious, in contradistinction to such materials as nitrogen, oxygen, sulfur trioxid and even small amounts of sulfuric acid, which are, by contrast, innoxious as regards their action on the contact mass. It is, also, generally conceded that these impurities tend to concentrate in or on liquid particles suspended in the gases and which form mists, fogs or clouds. There is always some sulfur trioxid or sulfuric acid formed in the burners themselves which form clouds upon lowering the temperature. It has, therefore, been the endeavor, in most processes, to filter the gases at a moderate temperature as perfectly as possible before going to the platinum contact substances, in order to remove any suspended particles which they may contain. This is, sometimes, done without the introduction of water into the gases, as in the Mannheim process, and, sometimes, it is done after very thorough agitation with water or steam, as in the Badische process. In such treatments it is, sometimes, expedient to remove, by sedimentation or rough filtration, the coarser dirt from the gases before introducing the water or steam and finally removing the finer particles or mist proper.

In order now to understand my invention, the nature of which I shall presently state, it must be noted that in all former practice, after once removing all the mist practicable, no attempt has been made to again produce in the gases and subsequently remove therefrom a mist or cloud of suspended liquid particles for the purpose of purification, and still less to repeat this cycle of operation, until a given degree of purity is attained. In such repetition, whether once or more than once, my invention is distinguished from all former practice; and my said invention may, therefore, be stated, in general terms, to consist in causing successive formations and precipitations of non-gaseous particles in the gases to be purified.

As more specifically applied to burner gases in the contact sulfuric acid process, my invention consists, further, and more specifically, in artificially forming, by chemical reaction between gaseous constituents out in the body of these gases a cloud of fine particles of pure sulfuric acid, after the very impure acid resulting from hydration and cooling of the sulfur trioxid, incidentally produced in the roasting process, has been removed, and then removing this cloud of fine particles together with the residual impurities it has absorbed, by the precipitating action of electric charges, and repeating this treatment with successive portions of pure acid until the desired degree of purification is attained. The advantage of such successive treatment, over treatment in one step, even were the total amount of mist removed the same in both cases, is analogous to that advantage obtained when extracting a substance from one solvent by shaking with another solvent immiscible with the first, if we divide the second solvent into a number of small portions and treat the first solvent with each of these portions successively, instead of using all of the second solvent at once. The advantages of this procedure are too familiar to those acquainted with chemical technology, to require discussion here.

While my invention in its most general aspect is not limited or confined to any particular composition of the mist particles to be formed, still, as far as contact sulfuric acid plants are concerned, sulfuric acid, formed in the body of the gas itself by the combination of aqueous vapor and sulfur trioxid, is probably most convenient and expedient. Nor is my invention, in its essence, limited to any particular method or apparatus, either in the formation or the removal of the mist or cloud of suspended particles. I will, however, describe in detail, as illustrative of the invention, the preferential method in a particular case, namely, in that of the gases going to sulfur trioxid contact chambers, and, in this connection, I show an apparatus in the accompanying drawings in which said method may be carried out.

In the drawings, Figure 1 is a horizontal longitudinal section of a flue, through which the gases flow in the direction of the arrow. Fig. 2 is a vertical longitudinal section of the same.

A is a flue, through which the gases on their way to the contact chambers pass, the arrow here indicating the direction. Within the flue, and traversing it, is suitably mounted a screen $B^1$, followed at an interval by a second screen $B^2$, and, at successive intervals by two more screens $B^3$ and $B^4$. Above each of these screens is a feed-trough B, Fig. 2, to which water or weak sulfuric acid is supplied. The water or weak acid overflowing the troughs trickles down each screen giving off aqueous vapor, and is received in underlying discharge troughs $B^5$ which suitably dispose of it. Following each of the water or weak acid bearing screens, and separated from it by a relatively small distance is another screen. There are four of these designated by $C^1$, $C^2$, $C^3$ and $C^4$ respectively. Each of these screens is supplied with fuming sulfuric acid from a feed trough C above, which acid trickling down the screens gives off sulfur trioxid vapor, and is received in underlying discharge troughs $C^5$. These screens may be constructed of any suitable material.

Within the flue A, in each space following the fuming acid-bearing screens are mounted the electrodes D and E. In each series of these electrodes, there are electrodes D of one polarity, alternating with electrodes E of the opposite polarity. The electrodes D are supported from bus-bars $d$ resting on insulators $d^1$, while the electrodes E are supported from bus-bars $e$ resting directly upon the walls of the flue. The electrodes may conveniently receive their electric charges from the high potential side of the step-up transformer T, through the intermittently contacting hub H driven by the synchronous motor M in such wise as to make contact at or near the peak of the voltage wave of the high potential winding of the transformer T, as more fully discussed in my United States Patent No. 859,729, Aug. 11, 1908, the electrodes E and flue wall being grounded, as indicated at G, for greater safety. In the drawing the bus-bars and electrical circuits are only shown for the last set of electrodes, it being understood that the others may be connected in similar manner to the same source of electricity. These electrodes D and E, by their discharges, precipitate the mist. In this apparatus my process is carried out by bringing the gases in contact with the water or weak sulfuric acid on the screen $B^1$, whereby aqueous vapor is supplied to them, followed immediately by contact with the fuming acid on screen $C^1$, thereby giving sulfur trioxid to them, thus introducing by evaporation first gaseous water and then sulfur trioxid which react with one another in the body of the gas and produce a fog, mist or cloud composed principally of particles of sulfuric acid, the temperature of the gas being maintained such that although water and sulfur trioxid separately will readily evaporate, the sulfuric acid formed by their union in the gaseous state will immediately condense as droplets of mist. A suitable temperature for this process, as the term is herein used is thus characterized. The electric charges upon the first series of electrodes D and E then precipitate the mist thus formed. The gases, then, passing on to the screens $B^2$ and $C^2$, are again acted upon by the water and fuming acid, to reform the mist or cloud, which is again precipitated by the electric charges upon the second series of electrodes D and E; and so on throughout the flue.

If, in any given case, it should prove more convenient, the water vapor may be blown directly into the gases in the form of steam, and the sulfur trioxid may likewise be drawn as gas directly from the mains coming from the contact chambers, and delivered as such to the flue; or various other methods of producing the desired cloud may be employed, all still within the invention I herein claim.

Having thus described my invention, what I claim as new and desire to secure by Letters Patent is:—

1. The improvement in the art of purifying gases which consists in repeatedly forming a cloud of non-gaseous particles of innoxious material in said gases and removing each such cloud of particles together with the noxious impurities absorbed from the gas by its particles, before the formation of the next-succeeding cloud in the same mass of gas.

2. The improvement in the art of purifying gases which consists in repeatedly forming a cloud of non-gaseous particles of innoxious material in said gases, and removing, by electric charges, each such cloud of particles together with the noxious impurities absorbed from the gas by its particles, before the formation of the next succeeding cloud in the same mass of gas.

3. The process of purifying the gases going to the contact mass in the manufacture of sulfur trioxid by the contact method which consists in repeatedly forming a cloud of non-gaseous particles of innoxious material in said gases and removing each such cloud of particles together with the noxious impurities absorbed from the gas by its particles before the formation of the next succeeding cloud in the same mass of gas.

4. The process of purifying the gases going to the contact mass in the manufacture of sulfur trioxid by the contact method which consists in repeatedly forming a cloud of non-gaseous particles of innoxious material in said gases and removing each such cloud of particles together with the noxious impurities absorbed from the gas by its particles by the application of electric charges before the formation of the next succeeding cloud in the same mass of gas.

5. That step in the purification of the gases going to the contact mass in the manufacture of sulfur trioxid by the contact method which consists in producing in said gases at a suitable temperature a cloud of suspended particles of sulfuric acid after said gases have been freed from substantially all sulfuric acid and other suspended particles which they may have previously contained, and thereby absorbing by said particles noxious impurities still contained in said gases.

6. That step in the purification of the gases going to the contact mass in the manufacture of sulfur trioxid by the contact method which consists in bringing said gases at a suitable temperature into contact with a liquid giving off sulfur trioxid vapor and another liquid giving off water vapor for the purpose of producing a cloud of suspended particles of sulfuric acid in said gases, and thereby absorbing by said particles noxious impurities still contained in said gases.

7. The process of purification of the gases going to the contact mass in the manufacture of sulfur trioxid by the contact method which consists in producing in said gases, at a suitable temperature, a cloud of suspended particles of sulfuric acid after said gases have been freed from substantially all sulfuric acid and other suspended particles which they may have previously contained, and finally removing said artificially produced cloud of sulfuric acid particles from said gases, together with noxious impurities of said gases which said particles of sulfuric acid have absorbed.

8. The process of purification of the gases going to the contact mass in the manufacture of sulfur trioxid by the contact method which consists in producing in said gases, at a suitable temperature, a cloud of suspended particles of sulfuric acid after said gases have been freed from substantially all sulfuric acid and other suspended particles which they may have previously contained and thereby absorbing by said particles noxious impurities still contained in said gases; then removing said artificially produced cloud of sulfuric acid particles together with said noxious impurities thus absorbed, from said gases; and then repeating the alternate production and removal of said suspended particles until the desired degree of purification is attained.

9. The process of purification of the gases going to the contact mass in the manufacture of sulfur trioxid by the contact method which consists in producing in said gases, at a suitable temperature, a cloud of suspended particles of sulfuric acid after said gases have been freed from substantially all sulfuric acid and other suspended particles which they may have previously contained, and finally removing said artificially produced cloud of sulfuric acid particles from said gases together with the noxious impurities of said gases which said particles of sulfuric acid have absorbed by the application of electric charges.

10. The process of purification of the gases going to the contact mass in the manufacture of sulfur trioxid by the contact method which consists in producing in said gases, at a suitable temperature, a cloud of suspended particles of sulfuric acid after said gases have been freed from substantially all sulfuric acid and other suspended particles which they may have previously contained and thereby absorbing by said particles noxious impurities still contained in said gases; then removing said artificially produced cloud of sulfuric acid particles together with said noxious impurities from said gases by the application of electric charges; and then repeating the alternate production and removal of said suspended particles until the desired degree of purification is attained.

11. The process of purification of the gases going to the contact mass in the manufacture of sulfur trioxid by the contact method which consists in bringing said gases at a suitable temperature into contact with a liquid giving off sulfur trioxid vapor and with another liquid giving off water vapor for the purpose of producing a cloud of suspended particles of sulfuric acid in said gases after said gases have been freed from substantially all sulfuric acid and other suspended particles which they may have previously contained thereby absorbing by said particles noxious particles still contained in said gases; then removing said artificially produced cloud of sulfuric acid particles from said gases together with said noxious impurities thus absorbed by the application of electric charges; and then repeating this alternate production and removal of suspended particles until the desired degree of purification is attained.

In testimony whereof I have signed my name to this specification in the presence of two subscribing witnesses.

FREDERICK GARDNER COTTRELL.

Witnesses:
 WM. F. BOOTH,
 D. B. RICHARDS.